(12) United States Patent
Förg

(10) Patent No.: US 11,607,569 B2
(45) Date of Patent: Mar. 21, 2023

(54) ASSEMBLY COMPRISING A PLURALITY OF FIRE PROTECTION PROFILES AND METHOD FOR PRODUCING A FIRE PROTECTION PROFILE

(71) Applicant: Hilti Aktiengesellschaft, Schaan (LI)

(72) Inventor: Christian Förg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 281 days.

(21) Appl. No.: 15/733,163

(22) PCT Filed: Jan. 14, 2019

(86) PCT No.: PCT/EP2019/050791
§ 371 (c)(1),
(2) Date: Jun. 2, 2020

(87) PCT Pub. No.: WO2019/145175
PCT Pub. Date: Aug. 1, 2019

(65) Prior Publication Data
US 2021/0146173 A1    May 20, 2021

(30) Foreign Application Priority Data
Jan. 24, 2018 (EP) .................................... 18153209

(51) Int. Cl.
*E04B 1/94* (2006.01)
*A62C 2/06* (2006.01)
(Continued)

(52) U.S. Cl.
CPC ............... *A62C 2/065* (2013.01); *A62C 3/16* (2013.01); *F16L 5/04* (2013.01); *C09K 21/02* (2013.01); *E04B 1/947* (2013.01); *E04B 1/948* (2013.01)

(58) Field of Classification Search
CPC ... A62C 2/065; A62C 3/16; F16L 5/04; C09K 21/02; E04B 1/948; E04B 1/947
(Continued)

(56) References Cited

U.S. PATENT DOCUMENTS

| 4,015,386 A | * | 4/1977 | Cook | ......................... E06B 5/16 52/302.1 |
| 9,637,915 B1 | * | 5/2017 | Hensley | .................. E04B 1/948 |

(Continued)

FOREIGN PATENT DOCUMENTS

| DE | 4139375 A1 * | 6/1993 | ............. A62C 2/065 |
| DE | 43 25 966 | 2/1995 | |

(Continued)

OTHER PUBLICATIONS

Rectorseal, "Rectorseal Flamesafe Bags", Sep. 16, 2009, XP055490429, 6 pages.
(Continued)

*Primary Examiner* — Brent W Herring
(74) *Attorney, Agent, or Firm* — Grüneberg and Myers PLLC

(57) ABSTRACT

An assembly includes at least two fire protection profiles which have a hose that is made of a composite material and is filled with a fire protection material. The composite material has an inorganic fiber material which is connected to a film, and the fire protection profiles are designed such that said profiles bake together in the event of a fire. Furthermore, a method for producing a fire protection profile is provided.

17 Claims, 4 Drawing Sheets

(51) Int. Cl.
*F16L 5/04* (2006.01)
*A62C 3/16* (2006.01)
*C09K 21/02* (2006.01)

(58) Field of Classification Search
USPC .......................... 52/220.5, 317, 232; 169/48
See application file for complete search history.

(56) References Cited

U.S. PATENT DOCUMENTS

| | | | | |
|---|---|---|---|---|
| 9,833,646 | B2* | 12/2017 | Forg | F16L 5/04 |
| 2003/0079425 | A1* | 5/2003 | Morgan | E04B 2/82 |
| | | | | 52/232 |
| 2004/0045234 | A1* | 3/2004 | Morgan | F16L 5/04 |
| | | | | 52/232 |
| 2004/0157012 | A1* | 8/2004 | Miller | A62C 2/06 |
| | | | | 428/34.1 |
| 2006/0006611 | A1* | 1/2006 | Foerg | F16L 5/02 |
| | | | | 277/602 |
| 2012/0251762 | A1* | 10/2012 | Forg | F16L 5/04 |
| | | | | 428/68 |
| 2014/0227160 | A1* | 8/2014 | Olbert | C01B 17/79 |
| | | | | 423/535 |
| 2014/0360118 | A1* | 12/2014 | Hensley | E21D 11/385 |
| | | | | 52/309.4 |
| 2016/0097197 | A1* | 4/2016 | Pilz | E04B 2/7457 |
| | | | | 52/506.01 |
| 2022/0080235 | A1* | 3/2022 | Sobol | E04B 1/68 |

FOREIGN PATENT DOCUMENTS

| | | | | | |
|---|---|---|---|---|---|
| DE | 10303943 | A1 | * | 6/2004 | ........... H02G 3/0412 |
| DE | 202015002895 | U1 | * | 7/2015 | ........... H02G 3/0412 |
| EP | 0544600 | A1 | * | 6/1993 | ............. A62C 2/065 |
| EP | 1429436 | A2 | * | 6/2004 | ........... H02G 3/0412 |
| EP | 3628789 | A1 | * | 4/2020 | ........... E04B 1/6812 |
| GB | 2216220 | A | * | 10/1989 | ............. A62C 2/065 |
| WO | WO-9922107 | A1 | * | 5/1999 | ............. A62C 2/065 |
| WO | 2017/194588 | | | 11/2017 | |

OTHER PUBLICATIONS

International Search Report dated Feb. 4, 2019 in PCT/EP2019/050791, with English translation, 6 pages.
Written Opinion dated Feb. 4, 2019 in PCT/EP2019/050791.

* cited by examiner

ASSEMBLY COMPRISING A PLURALITY OF FIRE PROTECTION PROFILES AND METHOD FOR PRODUCING A FIRE PROTECTION PROFILE

CROSS-REFERENCE TO RELATED APPLICATIONS

This application is a National Stage entry under § 371 of International Application No. PCT/EP2019/050791, filed on Jan. 14, 2019, and which claims the benefit of European Application No. 18153209.4, filed on Jan. 24, 2018. The content of each of these applications is hereby incorporated by reference in their entirety.

BACKGROUND OF THE INVENTION

Field of the Invention

The present invention relates to an assembly having a plurality of fire protection profiles and to a method for producing a fire protection profile.

Discussion of the Background

Fire protection insulation materials such as fire protection cushions and fire protection bricks are used to insulate wall and ceiling feedthroughs. Said materials often consist of polyurethane.

These block- or pillow-shaped materials are layered to form a fire stop in an aperture to be sealed.

The disadvantage here is that usually a large number of said units have to be joined to form a fire stop and that the units have to be cut to size in order to adapt to line feedthroughs. Additional sealants are often used in order to reduce cutting, but this is also complex.

A lower density would simplify the installation process, but is disadvantageous in relation to fire resistance. The units usually have a density of 200-400 kg/m$^3$.

Another disadvantage is that the units are produced in a single-mold production method, which is not very effective.

SUMMARY OF THE INVENTION

A problem addressed by the present invention is therefore that of providing fire protection that is reliable and is simple to install. A further problem addressed by the invention is that of providing a simplified method for producing fire protection profiles.

This problem is solved by an assembly comprising at least two fire protection profiles which have a hose that is made of a composite material and is filled with a fire protection material, the composite material having an inorganic fiber material which is connected to a film, the fire protection profiles being designed such that they bake together in the event of a fire. In this context, baking means that the fire protection material of a first fire protection profile expands through the composite material of an immediately contiguous second fire protection profile in the direction of the interior of the second fire protection profile and partially penetrates the composite material, and, vice versa, the fire protection material of the second fire protection profile expands in the direction of the interior of the first fire protection profile, which allows a connection between the two fire protection profiles.

DETAILED DESCRIPTION OF THE INVENTION

Figure 1:
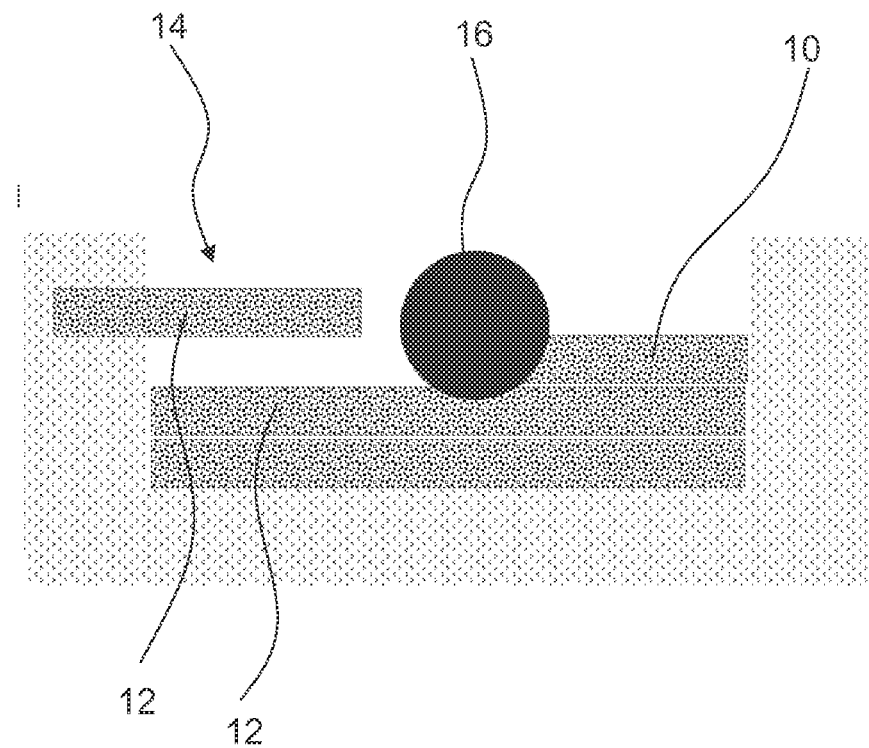
FIG. 1 schematically shows an assembly according to the invention which comprises a plurality of fire protection profiles and is arranged in a wall aperture.

The hose made of composite material forms a thermally resistant sleeve, which has the positive effect that a stable ash crust is formed, in particular by compressing the fire protection material. The stable ash crust and the composite material also improve the properties during the hose stream test.

Owing to these positive effects, particularly good fire properties can be achieved at a reduced density. In addition, fewer intumescent additives than usual are required.

For example, the density of the fire protection material in the hardened state can be between 100 kg/m$_3$ and 200 kg/m$^3$, in particular 150 kg/m$^3$. This has the particular advantage that the fire protection profiles can be compressed at least to some extent. This means that there is no need for complex cutting when sealing apertures. For example, a straight cut can be sufficient in order to adapt the fire protection profile to a line feedthrough. In addition, at a lower density, the amount of material used is reduced.

An individual design is possible by means of the film in the composite material, for example by printing on the film. Depending on the selection of the film, the film can also be painted over. For food sectors, a film that has a surface that is easy to clean or a disinfectable film can be selected. In addition, the film can contribute to an improvement in the sealing properties, for example a better seal against smoke, air, sound and odors. Furthermore, the film can be used as a carrier material for the inorganic fiber material.

The film can have or comprise a plastics material, such as a composite film, including composite films having a metal layer, for example aluminum composite films, or can consist of a plastics material.

The fire protection material is, for example, an intumescent material. This ensures particularly reliable fire protection.

According to one embodiment, the fire protection material can comprise polyurethane. Fire protection additives may also be contained in the fire protection material.

The inorganic fiber material can be a woven fabric, a knitted fabric or a non-woven fabric. It is advantageous here that these fiber materials are permeable at least to some extent. In the event of a fire, the fire protection material can therefore intumesce through the fiber material. This allows the fire protection profiles, which are in contact with one another, to bake together. Furthermore, fiber materials of this type are flexible and are easy to handle when producing a fire protection profile.

Glass fibers, basalt fibers, ceramic fibers, metal fibers or threads or wires, or a fiber material made of different materials, such as inorganic composite materials, for example glass fibers having metal wire, are particularly suitable for the fiber material.

The fiber material preferably has a plurality of holes. The fire protection material can intumesce through the holes such that baking of the individual fire protection profiles is promoted. A hole size of approximately 3 mm×3 mm has proven to be particularly advantageous. At this size, sufficient fire protection material can intumesce through the holes; at the same time, there is sufficient dimensional stability of the fire protection profile. However, the hole size can also vary, for example it can be between 1 mm×1 mm and 5 mm×5 mm.

Alternatively or in addition, the fiber material can have combustible fibers and non-combustible fibers. This has the advantage that the fiber material is sufficiently dense during production in order to hold the fire protection material within the hose. However, in the event of a fire, when the combustible fibers are burned, intumescence of the fire protection material through the fiber material is simplified, as a result of which baking of fire protection profiles in contact with one another is facilitated.

A fire protection profile preferably has a rectangular cross section. As a result, the fire debris profiles can be stacked, particularly simply and without gaps, in a wall or ceiling aperture.

Furthermore, the problem is solved according to the invention by a method for producing a fire protection profile, the method comprising the following steps:
- producing a continuous hose from a composite material,
- filling the continuous hose with a liquid fire protection material,
- foaming the fire protection material,
- dividing the continuous hose into fire protection profile pieces.

A production method of this type is particularly efficient; in particular, fully automated manufacturing involving little manual effort is possible, which leads to lower production costs.

The fire protection profile pieces can be cut to a length of 80 cm, for example, in order to allow easy handling during packaging and transport. Before installation, the profile pieces can be cut into shorter pieces by a user if required.

According to one embodiment, the continuous hose can be glued or welded at a seam. This prevents the continuous hose from being pushed open when the fire protection material is foamed. However, it is also conceivable that fixation be omitted and the hose be glued by the fire protection material during foaming.

In order to give the fire protection profile its shape, the continuous hose can be held, when the fire protection material is foamed, by means of support elements which abut on all sides.

Figure 2:
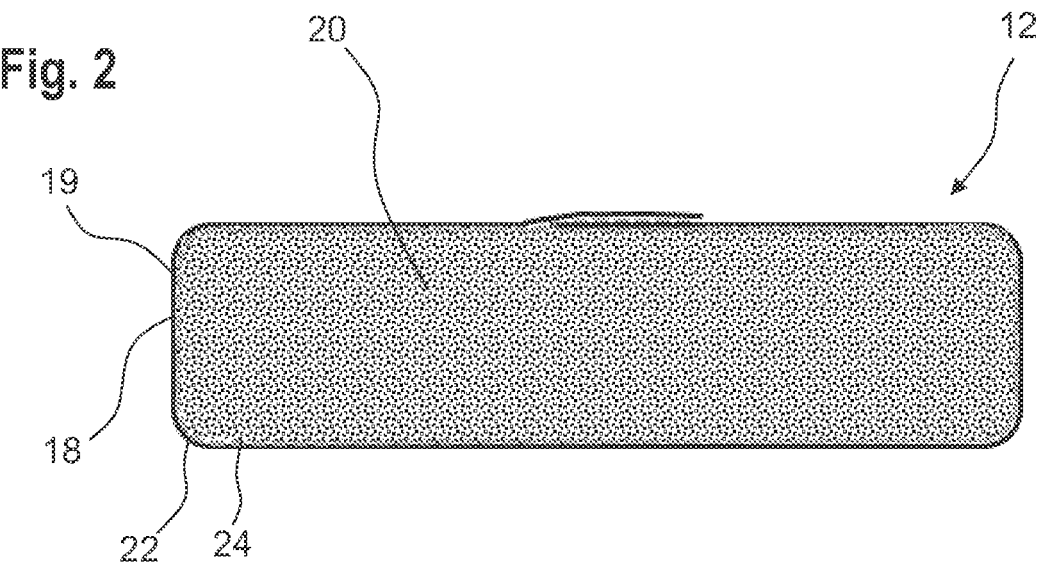
FIG. 2 schematically shows a fire protection profile.
Figure 3:
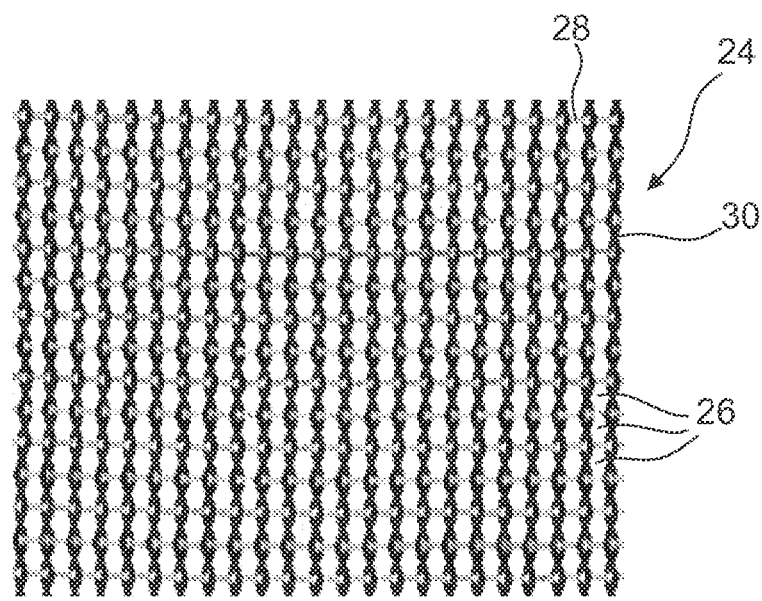
FIG. 3 schematically shows an inorganic fiber woven fabric.

Further advantages and features of the invention can be found in the following description and the drawings to which reference is made. In the drawings:

FIG. 1 schematically shows an assembly according to the invention which comprises a plurality of fire protection profiles and is arranged in a wall aperture;

FIG. 2 schematically shows a fire protection profile;

FIG. 3 schematically shows an inorganic fiber woven fabric; and

Figure 4:
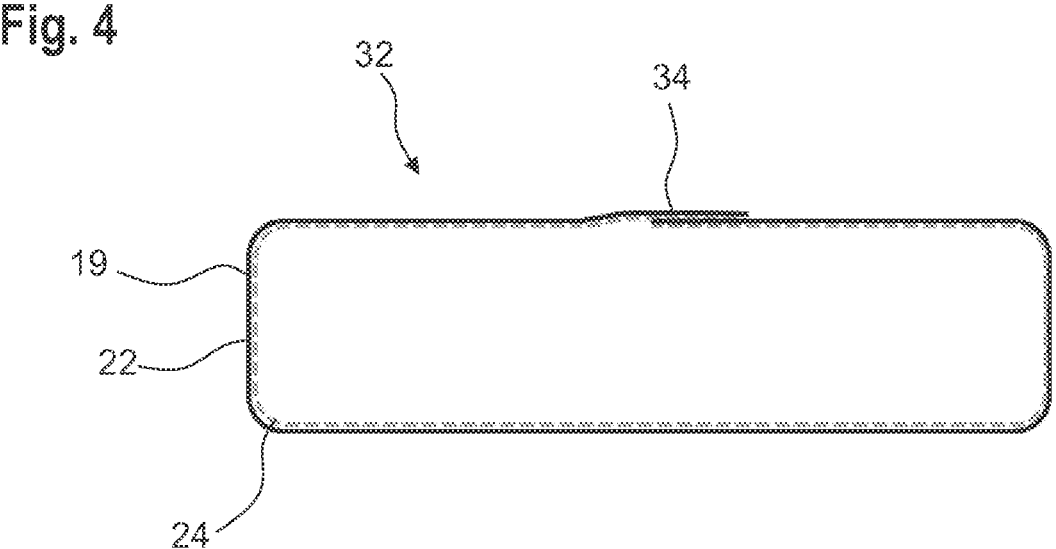
FIGS. 4 and 5 show steps in the production of a fire protection profile.
Figure 5:
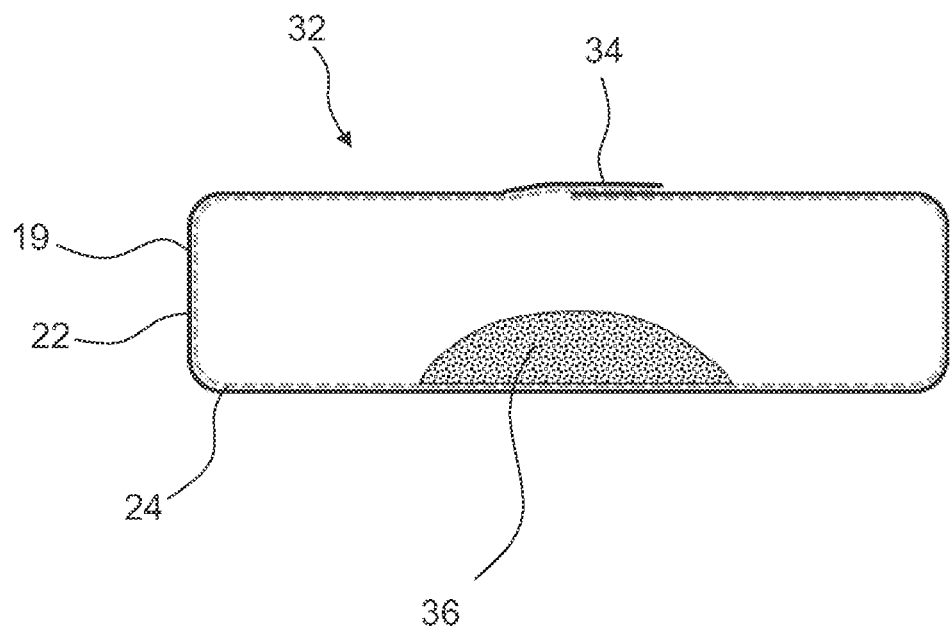

FIGS. 4 and 5 show steps in the production of a fire protection profile.

Figure 6:
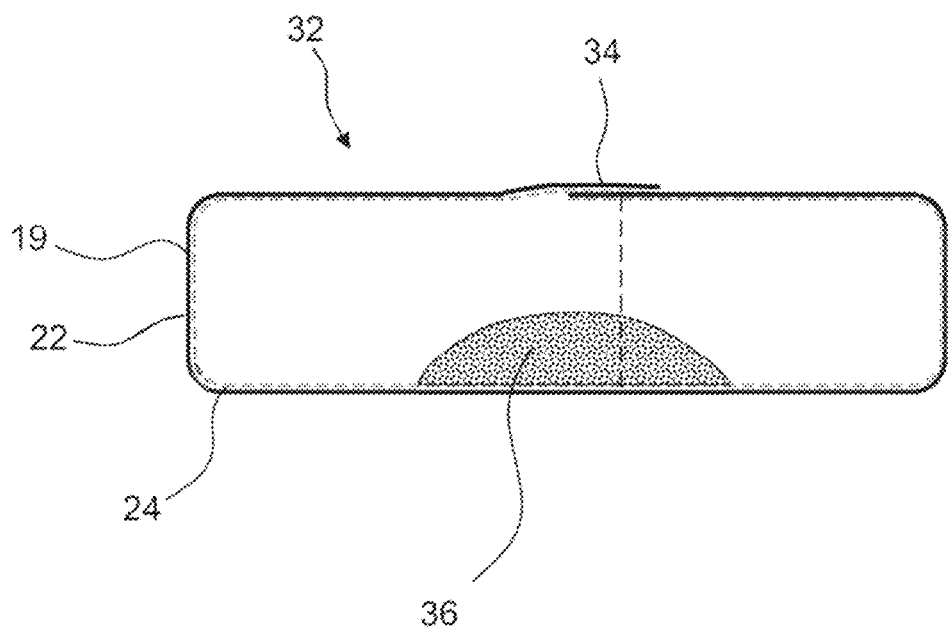
FIG. 6 shows an example of a fire protection material divided into a plurality of fire protection profiles.

FIG. 6 shows an example of a fire protection material divided into a plurality of fire protection profiles.

FIG. 1 schematically shows an assembly 10 according to the invention which comprises a plurality of fire protection profiles 12 and is arranged in a wall aperture 14 in order to seal said aperture. A line feedthrough 16 is arranged in the wall aperture 14. The line feedthrough 16 can be a pipe or a cable.

The fire protection profiles 12 have a hose 18 that is made of a composite material 19 and is filled with a fire protection material 20. A detailed sectional view of a fire protection profile 12 is shown schematically in FIG. 2.

The fire protection material 20 is preferably an intumescent material.

The composite material 19 is composed of a film 22 and an inorganic fiber material 24. In FIG. 2, the film 22 is illustrated by a solid line and the fiber material 24 is illustrated by a dashed line.

The film 22 forms an outer surface of the fire protection profile 12. This has the advantage that the fire protection profile 12 can be given an individual design by printing on the film 22. Depending on the selection of the film 22, the fire protection profile 12 can also be painted over or easy to clean.

The fiber material 24 can be a woven fabric, a knitted fabric or a non-woven fabric, in particular made of glass fibers, basalt fibers or ceramic fibers, metal fibers or threads or wires, or a fiber material made of different materials, such as inorganic composite materials, for example glass fibers having metal wire.

If a particular temperature is exceeded, for example in the event of a fire, the fire protection material 20 expands and can escape out from the hose 18 through the composite material 19.

In the case of an assembly 10 comprising a plurality of fire protection profiles 12, as shown in FIG. 1, the fire protection profiles 12 that are adjacent to one another can bake together. This ensures particularly reliable fire protection.

The fire protection material 20 preferably has a low density, for example between 100 kg/m$^3$ and 200 kg/m$^3$. The solids content of the hardened fire protection material is preferably between 20 g and 30 g, in particular 27 g, in each case based on one liter of hardened fire protection material. As a result, the fire protection profile 12 is compressible and can be adapted particularly well to the line feedthrough 16.

A fire protection profile 12 has, for example, a height of 35 mm, a width of 150 mm and a length of 800 mm. In the mounted state, the width extends in a depth direction of the aperture 14 to be sealed. The optimal width therefore depends on the desired fire resistance duration. However, a sufficient fire resistance duration can generally be ensured at a width of 150 mm.

In comparison with fire protection bricks, the fire protection profile 12 has the advantage that, due to its length, only a few profiles are required to seal an aperture 14. In particular, a fire protection profile 12 can extend across an entire width of an aperture 14, as shown in FIG. 1. It may only be required to use shorter profile pieces 12 in the region of the line feedthrough 16. Said shorter profile pieces can be created simply by trimming the fire protection profiles 12. As a result, the installation time can be particularly short overall.

FIG. 3 schematically shows a layer of the inorganic fiber material 24 that is present in the composite material 19. The fiber material 24 has a plurality of holes 26 through which the fire protection material 20 can intumesce in the event of a fire. As a result, fire protection profiles 12 that are adjacent to one another can bake together, thereby achieving particularly good fire protection. The fiber material 24 is loosely woven, i.e. the individual fibers are not fixed to one another. As a result, the woven fabric is particularly flexible.

In one embodiment, the fiber material 24 has combustible fibers 28 and non-combustible fibers 30. In the illustration in FIG. 3, the combustible fibers 28 extend horizontally and the non-combustible fibers 30 extend vertically. This embodiment has the advantage that the combustible fibers 28 burn in the event of a fire and the fire protection material 20 can intumesce particularly well through the composite material 19.

The fiber material 24 also facilitates the formation of a stable ash crust.

FIGS. 4 and 5 schematically illustrate a method for producing a fire protection profile 12 as shown in FIG. 2.

First, a composite material 19 is provided, for example in the form of strips, which is formed into a continuous hose 32 by being folded over. FIG. 4 schematically showed a cross section through a continuous hose 32 of this type.

This creates a material overlap, in particular a seam 34, along which the continuous hose 32 can be glued or welded.

A liquid fire protection material 36 is then filled into the continuous hose 32 and foamed. The solids content of the liquid fire protection material 36 is, for example, 18 wt. %.

During the foaming, the continuous hose 32 is stabilized in order to obtain a desired shape of the fire protection profile 12, for example a profile having a substantially rectangular cross section. The stabilization is carried out, for example, by means of conveyor belts which abut on all sides.

After the fire protection material 20 has hardened, the resulting continuous profile can be divided into individual fire protection profiles 12 in a desired length, as shown, for example, in FIG. 6.

The invention claimed is:

1. An assembly, comprising:
   at least two fire protection profiles, each of which comprises a hose that is made of a composite material and is filled with a fire protection material,
   wherein the composite material has a layer comprising a plurality of preformed holes which is connected to a film, the plurality of holes in the at least two fire protection profiles facing one another,
   wherein the at least two fire protection profiles are configured to bake together in a combined state in the event of a fire, the fire protection material of a first one of the at least two fire protection profiles moving through the plurality of holes and penetrating into an interior of the fire protection material through the plurality of holes of a second one of the at least two fire protection profiles based on heat from the fire, and
   wherein the layer has combustible fibers and non-combustible fibers, the combustible fibers burning away to increase a size of the plurality of holes in each of the at least two fire protection profiles when exposed to the heat from the fire.

2. The assembly according to claim 1, wherein the fire protection material is an intumescent material.

3. The assembly according to claim 1, wherein the combustible fibers and the non-combustible fibers are arranged in a woven fabric, a knitted fabric or a non-woven fabric.

4. The assembly according to claim 1, wherein the at least one of the combustible fibers or the non-combustible fibers comprises an inorganic fiber material including glass fibers, basalt fibers, ceramic fibers, metal fibers, threads, wires, or a fiber material made of a different material.

5. The assembly according to claim 4, wherein the inorganic fiber material has a fiber material made of a different inorganic composite material.

6. The assembly according to claim 1, wherein at least one of the combustible fibers or non-combustible fibers comprise comprises an inorganic fiber material.

7. The assembly according to claim 1, wherein each of the at least two fire protection profiles has a rectangular cross section.

8. The assembly according to claim 1, wherein the fire protection material is compressible.

9. The assembly according to claim 1, wherein the at least two fire protection profiles are in an uncombined state prior to application of the heat from the fire.

10. The assembly according to claim 1, wherein:
    the fire protection material of the second one of the at least two fire protection profiles moves into holes of the fire protection material of the first one of the at least two fire protection profiles based on heat from the fire.

11. The assembly according to claim 1, wherein the at least two fire protection profiles comprise different fire protection materials.

12. The assembly according to claim 1, wherein the fire protection material of at least one of the at least two fire protection profiles is in a compressed state prior to application of heat from the fire.

13. The assembly according to claim 1, wherein the fire protection materials of the at least two fire protection profiles are in a compressed state.

14. The assembly according to claim 1, wherein the fire protection material of one or more of the at least two fire protection profiles has a density of about 100 kg/m$^3$ to about 200 kg/m$_3$.

15. A method for producing a fire protection profile, comprising:
    producing a continuous hose from a composite material;
    filling the continuous hose with liquid fire protection material;
    foaming the fire protection material; and
    dividing the continuous hose into fire protection profiles,
    wherein the composite material of each of the fire protection profiles has a layer comprising a plurality of preformed holes which is connected to a film, the plurality of holes in the at least two fire protection profiles facing one another, and
    wherein the layer has combustible fibers and non-combustible fibers, the combustible fibers burning away to increase a size of the plurality of holes in each of the at least two fire protection profiles when exposed to the heat from the fire.

16. The method according to claim 15, wherein the continuous hose is glued or welded at a seam.

17. The method according to claim 15, wherein the continuous hose is held, when the fire protection material is foamed, by elements which abut on all sides.

* * * * *